US009042834B2

(12) United States Patent
Iwamura et al.

(10) Patent No.: US 9,042,834 B2
(45) Date of Patent: May 26, 2015

(54) MOBILE STATION

(75) Inventors: Mikio Iwamura, Yokohama (JP);
Hiroaki Yamagishi, Tokyo (JP);
Hiroyuki Ishii, Yokosuka (JP); Takeshi Nakamori, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 12/810,441

(22) PCT Filed: May 29, 2009

(86) PCT No.: PCT/JP2009/059851
§ 371 (c)(1),
(2), (4) Date: Sep. 14, 2010

(87) PCT Pub. No.: WO2009/145291
PCT Pub. Date: Dec. 3, 2009

(65) Prior Publication Data
US 2011/0009067 A1 Jan. 13, 2011

(30) Foreign Application Priority Data
May 30, 2008 (JP) .................. 2008-143799

(51) Int. Cl.
*H04W 36/00* (2009.01)
*H04W 24/10* (2009.01)
(52) U.S. Cl.
CPC .......... *H04W 24/10* (2013.01); *H04W 36/0088* (2013.01)
(58) Field of Classification Search
CPC ............ H04W 24/10; H04W 36/0088

USPC ....................................... 455/67.11
See application file for complete search history.

(56) References Cited

U.S. PATENT DOCUMENTS

| | | | |
|---|---|---|---|
| 2005/0032520 A1* | 2/2005 | Muller ................. | 455/448 |
| 2007/0054689 A1* | 3/2007 | Baker et al. .......... | 455/522 |
| 2008/0014957 A1* | 1/2008 | Ore ..................... | 455/452.1 |
| 2008/0268845 A1* | 10/2008 | Wu et al. ............. | 455/436 |
| 2009/0005029 A1* | 1/2009 | Wang et al. .......... | 455/423 |
| 2009/0061847 A1* | 3/2009 | Roberts ............... | 455/423 |
| 2009/0233612 A1* | 9/2009 | Iwamura et al. ..... | 455/450 |

FOREIGN PATENT DOCUMENTS

| | | |
|---|---|---|
| GB | 2469027 A | 10/2010 |
| JP | 2005-006124 A | 1/2005 |
| KR | 20040036863 A | 5/2004 |
| WO | 00/70897 A1 | 11/2000 |
| WO | 2008000914 A1 | 1/2008 |

OTHER PUBLICATIONS

International Search Report issued in PCT/JP2009/059851, mailed on Jul. 21, 2009, with translation, 3 pages.

(Continued)

*Primary Examiner* — David Bilodeau
(74) *Attorney, Agent, or Firm* — Osha Liang LLP

(57) ABSTRACT

A mobile station (UE) according to the present invention is configured to repeatedly transmit a first measurement report including a radio quality of a first cell and to repeatedly transmit a second measurement report including a radio quality of a second cell at the same timings, when the mobile station starts transmitting the first measurement report and thereafter starts transmitting the second measurement report.

1 Claim, 10 Drawing Sheets

(56) References Cited

OTHER PUBLICATIONS

Written Opinion issued in PCT/JP2009/059851, mailed on Jul. 21, 2009, 3 pages.
Extended European Search Report for Application No. 09754799.6, mailed on Nov. 19, 2010 (6 pages).
Office Action for Russian Application No. 2010125710/07(036584) dated Aug. 16, 2011, with English translation thereof (8 pages).
Office Action for Korean Patent Application No. 10-2010-7013364 dated Jul. 14, 2011, with English translation thereof (5 pages).
Patent Abstract for Korean Publication No. 1020040036863 Published May 3, 2004 (1 page).
Australian Office Action for Australian Application No. 2009252222, dated Dec. 23, 2011 (2 pages).
Office Action for European Application No. 09754799.6 dated Mar. 21, 2012 (5 pages).
Office Action for Australian Application No. 2009252222 dated Mar. 30, 2012 (2 pages).
Office Action for Canadian Application No. 2,710,565 dated Jan. 16, 2013 (2 pages).
Office Action for corresponding Vietnamese Application No. 1-2010-02194, mailed Aug. 22, 2013 (4 pages).
Canadian Office Action issued in Canadian Patent Application No. 2,710,565, mailing date Jan. 7, 2014 (2 pages).
Office Action in the counterpart Canadian Patent Application No. 2,710,565, issued Dec. 4, 2014 (4 pages).

* cited by examiner

MOBILE STATION

TECHNICAL FIELD

The present invention relates to a mobile station configured to start transmitting a measurement report including a radio quality of a cell upon detecting that a monitor period has passed in a state where the radio quality of the cell still satisfies entering conditions, and to repeatedly transmit the measurement report at reporting intervals until leaving conditions are satisfied.

BACKGROUND ART

In a mobile communication system of the "LTE (Long Term Evolution)" system defined by the 3GPP, an "Event Triggered Periodical Reporting" system is known as a method of transmitting a "Measurement Report" by a mobile station UE.

In a case where the "Event Triggered Periodical Reporting" system is employed, a mobile station UE is configured to start transmitting a "Measurement Report (measurement report)" including an "RSRP: Reference Signal Received Power (radio quality)" of a cell designated by a radio base station eNB, upon detecting that "Time to Trigger (monitor period)" has passed in a state where the "RSRP (radio quality)" of the cell still satisfies entering conditions, and to repeatedly transmit the "Measurement Report (measurement report)" at "Reporting Intervals (reporting interval)" until leaving conditions are satisfied.

Specifically, as shown in FIG. 10, when a mobile station UE detects, at t1, that an "RSRP (radio quality)" of a cell A satisfies entering conditions, and detects, at t3, that "Time to Trigger (monitor period)" has expired in a state where the "RSRP (radio quality)" of the cell A still satisfies the entering conditions, the mobile station UE starts transmitting a "Measurement Report (measurement report)" including the "RSRP (radio quality)" of the cell A.

Thereafter, until leaving conditions are satisfied, the mobile station UE repeatedly transmits the "Measurement Report (measurement report)" at the "Reporting Intervals (reporting interval)", for example, at t5 and t7.

In the same manner, when the mobile station UE detects, at t2, that an "RSRP (radio quality)" of a cell B satisfies the entering conditions, and detects, at t4, that "Time to Trigger (monitor period)" has expired in a state where the "RSRP (radio quality)" of the cell B still satisfies the entering conditions, the mobile station UE starts transmitting a "Measurement Report (measurement report)" including the "RSRP (radio quality)" of the cell B.

Thereafter, until the leaving conditions are satisfied, the mobile station UE repeatedly transmits the "Measurement Report (measurement report)" at "Reporting Intervals (reporting interval)", for example, at t6 and t8.

BRIEF DESCRIPTION OF THE INVENTION

Problem to be Solved by the Invention

However, in a conventional method of repeatedly transmitting a "Measurement Report (measurement report)", such as the "Event Triggered Periodical Reporting" system, a mobile station UE transmits "Measurement Reports (measurement report)" more frequently as the number of cells to be measured by the mobile station UE increases. This causes a problem that radio resources may be wasted.

Accordingly, the present invention is made to address the above problem, and an object of the present invention is to provide a mobile station which is capable of implementing a method, such as an "Event Triggered Periodical Reporting" system, of repeatedly transmitting a "Measurement Report (measurement report)" by efficiently using radio resources.

Means for Solving the Problems

A first aspect of the present invention is summarized as a mobile station configured to start transmitting a measurement report including a radio quality of a cell upon detecting that a monitor period has passed in a state where the radio quality of the cell still satisfies an entering condition, and to repeatedly transmit the measurement report at reporting intervals until a leaving condition is satisfied, wherein, when the mobile station starts transmitting a first measurement report including a radio quality of a first cell and thereafter starts transmitting a second measurement report including a radio quality of a second cell, the mobile station is configured to repeatedly transmit the first measurement report and to repeatedly transmit the second measurement report, at the same timings.

In the first aspect, when the mobile station does not detect that the monitor period has passed in a state where the radio quality of the second cell still satisfies the entering condition, and when one of the timings to repeatedly transmit the first measurement report comes, the mobile station can be configured not to start transmitting the second measurement report.

In the first aspect, one of the timings to repeatedly transmit the first measurement report can be adjusted to concur with a timing to start transmitting the second measurement report.

In the first aspect, a timing to start transmitting the first measurement report can be adjusted to concur with a timing to start transmitting the second measurement report.

In the first aspect, a maximum reporting interval and a minimum reporting interval can be managed as the reporting intervals, and the mobile station can be configured to repeatedly transmit the first measurement report and to repeatedly transmit the second measurement report at the same timings, when a period between one of the timings to repeatedly transmit the first measurement report determined by the maximum reporting interval and one of the timings to repeatedly transmit the first measurement report determined by the minimum reporting interval overlaps at least partially with a period between one of the timings to repeatedly transmit the second measurement report determined by the maximum reporting interval and one of the timings to repeatedly transmit the second measurement report determined by the minimum reporting interval.

In the first aspect, a maximum reporting interval and a minimum reporting interval can be managed as the reporting intervals, and the mobile station can be configured to repeatedly transmit the first measurement report and to repeatedly transmit the second measurement report not at the same timings, when a period between one of the timings to repeatedly transmit the first measurement report determined by the maximum reporting interval and one of the timings to repeatedly transmit the first measurement report determined by the minimum reporting interval does not overlap even partially with a period between one of the timings to repeatedly transmit the second measurement report determined by the maximum reporting interval and one of the timings to repeatedly transmit the second measurement report determined by the minimum reporting interval.

In the first aspect, a maximum reporting interval and a minimum reporting interval can be managed as the reporting intervals, and the mobile station can be configured to adjust to concurs a starting point of the reporting interval used to determine the timings to repeatedly transmit the first measurement report a timing to start transmitting the second measurement report, when the mobile station starts transmitting the second measurement report within a period between one of the timings to repeatedly transmit the first measurement report determined by the maximum reporting interval and one of the timings to repeatedly transmit the first measurement report determined by the minimum reporting interval.

Effects of the Invention

As has been described so far, the present invention is able to provide a mobile station which is capable of implementing a method, such as an "Event Triggered Periodical Reporting" system, of repeatedly transmitting a "Measurement Report (measurement report)" by effectively using radio resources.

In order to transmit a "Measurement Report (measurement report)", a mobile station UE needs to receive an allocation of an uplink transmission resource from a radio base station eNB. Thus, the mobile station UE needs to transmit a "Scheduling Request (allocation request)" to a radio base station eNB.

In addition, in each of different timings when the radio base station eNB allocates an uplink transmission resource, the radio base station eNB needs to transmit "PDCCH" which is signaling to specify the resource.

Accordingly, by use of the present invention, it is possible to reduce overhead of the "Scheduling Request (allocation request)" or "PDCCH", as the repeated transmission of the "Measurement Report (measurement report)" is made less frequently.

BEST MODE FOR CARRYING OUT THE INVENTION (Mobile Communication System According to First Embodiment of the Present Invention)

Referring to FIG. 1 to FIG. 9, a description will be given of a configuration of a mobile communication system according to a first embodiment of the present invention. Hereinbelow, a mobile communication system which employs the LTE system will be described in the present embodiment. However, the present invention is not limited to this and is also applicable to mobile communication systems which employ other systems.

In addition, the above-described "Event Triggered Periodical Reporting" system is employed in the present embodiment, as a method of transmitting "Measurement Reports" by a mobile station UE.

Figure 1:
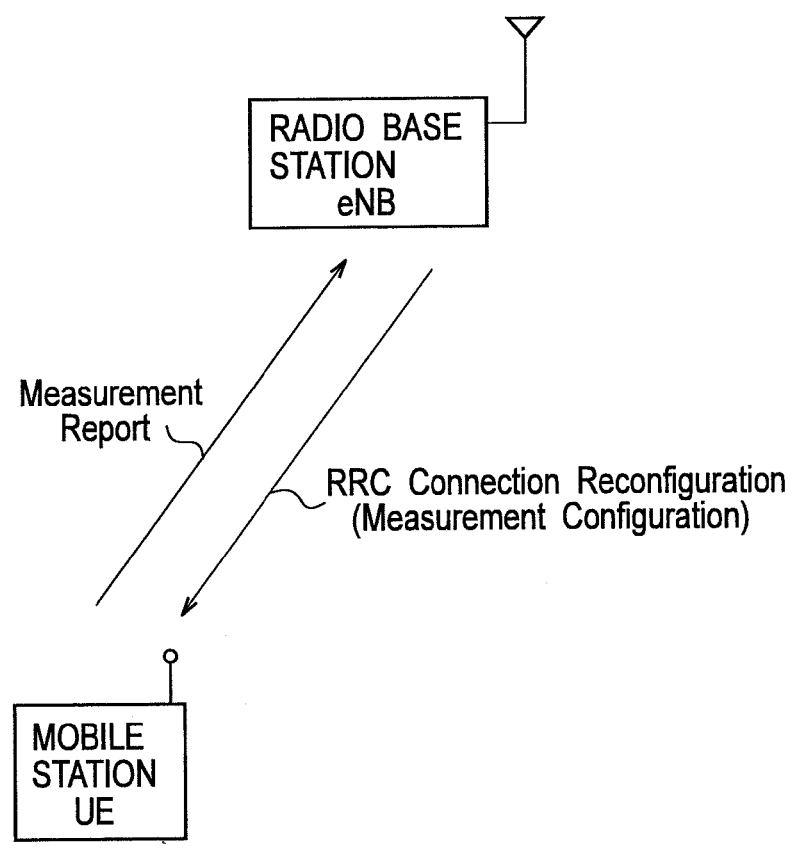
FIG. 1 is an entire configuration diagram of a mobile communication system according to a first embodiment of the present invention.

As shown in FIG. 1, in a mobile communication system according to the present embodiment, a radio base station eNB is configured to transmit a "Measurement Configuration" to the mobile station UE, by use of an "RRC Connection Reconfiguration".

Figure 2:
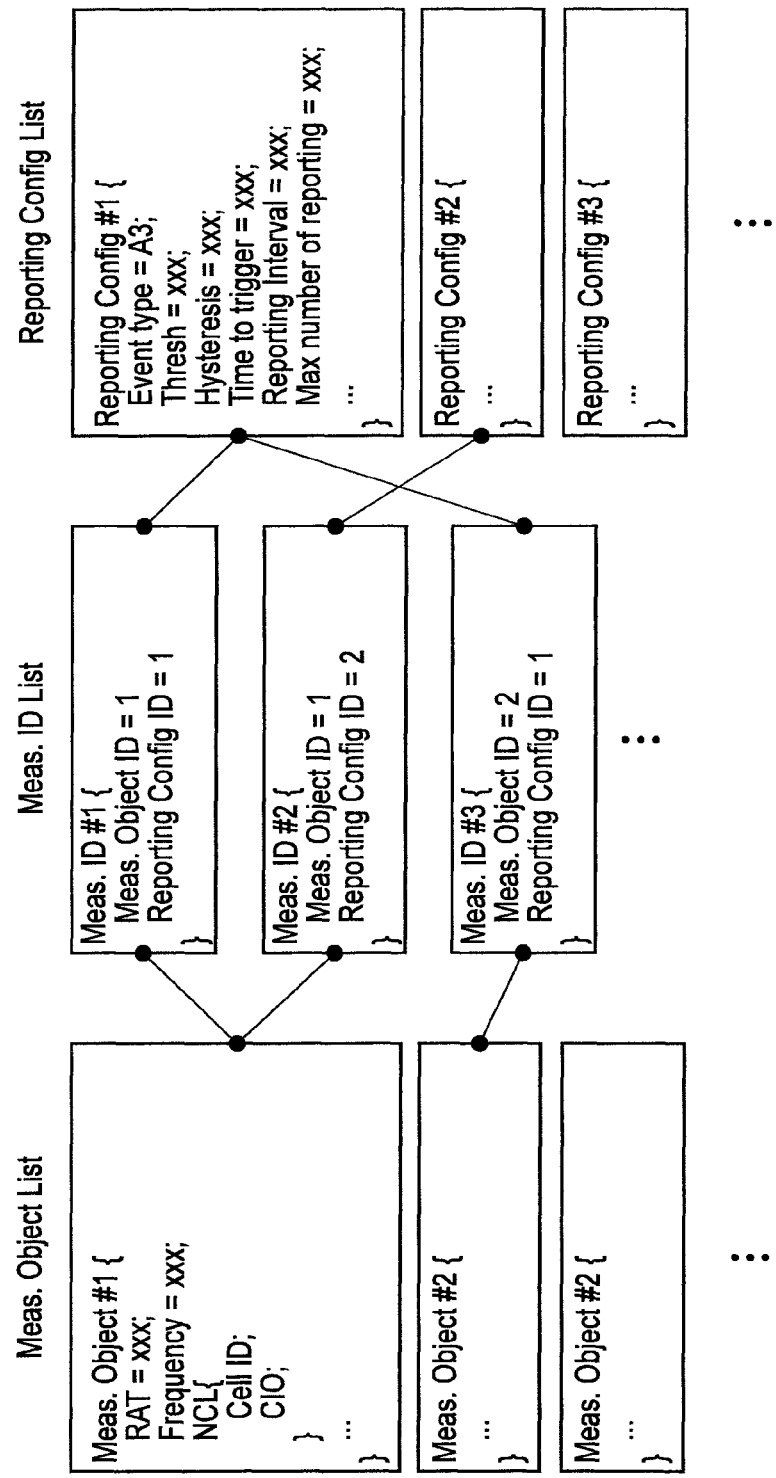
FIG. 2 is a diagram showing an example of a Measurement Configuration received by a mobile station according to the first embodiment of the present invention.

Specifically, as shown in FIG. 2, the radio base station eNB is configured to transmit a "Measurement ID", a "Measurement Object", or a "Reporting Configuration", by use of a "Measurement Configuration".

Here, the "Measurement Object" is information to designate a measurement target cell (for example, RAT information, frequency information, circumference cell information, or the like).

In addition, the "Reporting Configuration" is information to designate a method of transmitting a "Measurement Report (measurement report)". For example, the "Reporting Configuration" includes an "Event (entering conditions)", "Time to Trigger (monitor period)", a "Reporting Interval (reporting interval)", various parameters, and the like.

Moreover, the "Measurement ID" is information to associate the "Measurement Object" with the "Reporting Configuration".

The mobile station UE is configured to measure a radio quality (for example, RSRP) of a certain cell on the basis of the "Measurement Configuration" transmitted by the radio base station eNB, and to transmit a "Measurement Report (measurement report)" including the measurement result.

Figure 3:
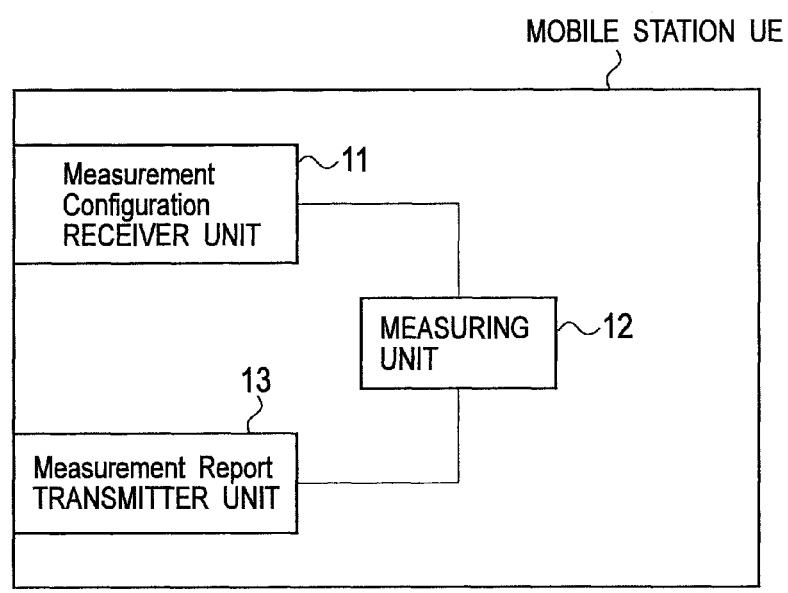
FIG. 3 is a functional block diagram of a mobile station according to the first embodiment of the present invention.

Specifically, as shown in FIG. 3, the mobile station UE includes a Measurement Configuration receiver unit 11, a measuring unit 12, and a Measurement Report transmitter unit 13.

The Measurement Configuration receiver unit 11 is configured to receive the "Measurement Configuration" transmitted by the radio base station eNB.

Here, the Measurement Configuration receiver unit 11 is configured to manage a "Measurement ID", a "Measurement Object", and a "Reporting Configuration", on the basis of the "Measurement Configuration" thus received.

The measuring unit 12 is configured to extract a "Measurement Object" associated with the "Measurement ID" managed by the Measurement Configuration receiver unit 11.

In addition, the measuring unit 12 is configured to measure a radio quality of a cell designated by the extracted "Measurement Object".

The Measurement Report transmitter unit 13 is configured to transmit a "Measurement Report (measurement report)" according to the "Event Triggered Periodical Reporting" system.

In other words, the Measurement Report transmitter unit 13 is configured to start transmitting a "Measurement Report (measurement report)" including a radio quality (for example, RSRP) of a measurement target cell which is measured by the measuring unit 12, when the Measurement Report transmitter unit 13 detects that "Time to Trigger (monitor period)" has passed in a state where the radio quality of the cell still satisfies "Event (entering conditions)", and to repeatedly transmit the "Measurement Report (measurement report)" at "Reporting Intervals (reporting interval)" until leaving conditions (for example, a predetermined number of transmission, or the like) are satisfied.

Specifically, the Measurement Report transmitter unit 13 is configured to extract a "Reporting Configuration" associated with the "Measurement ID" managed by the Measurement Configuration receiver unit 11.

In addition, the Measurement Report transmitter unit 13 is configured to transmit a "Measurement Report (measurement report)", on the basis of a method specified by the extracted "Reporting Configuration".

Here, consider a case where the Measurement Report transmitter unit 13 starts transmitting a "Measurement Report (first measurement report)" including a radio quality of a first cell, and then starts transmitting a "Measurement Report (second measurement report)" including a radio quality of a second cell. In this case, the Measurement Report transmitter unit 13 is configured to repeatedly transmit the "Measurement Report (first measurement report)", and to repeatedly transmit the "Measurement Report (second measurement report)" at the same timings.

Figure 4:
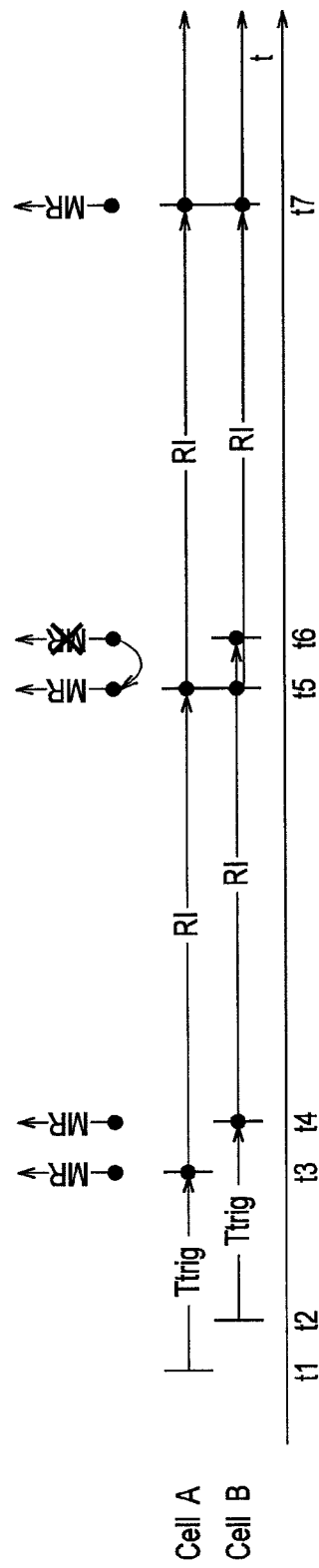
FIG. 4 is a functional block diagram of a core network device according to the first embodiment of the present invention.

For example, referring to FIG. 4, consider a case where the Measurement Report transmitter unit 13 starts transmitting, at t3, a "Measurement Report (first measurement report)" including a radio quality of a cell A (first cell), and then starts transmitting, at t4, a "Measurement Report (second measurement report)" including a radio quality of a cell B (second cell). In this case, the Measurement Report transmitter unit 13 is configured to repeatedly transmit the "Measurement Report (first measurement report)", and to repeatedly transmit "the Measurement Report (second measurement report)" at the same timings, i.e., at t5 and t7.

Meanwhile, consider a case where the Measurement Report transmitter unit 13 does not detect that "Time to Trigger (monitor period)" has passed in a state where the radio quality of the second cell still satisfies an "Event (entering conditions)". In this case, the Measurement Report transmitter unit 13 may be configured not to start transmitting the "Measurement Report (second measurement report)", even when one of timings to repeatedly transmit the "Measurement Report (first measurement report)" has come.

Figure 5:
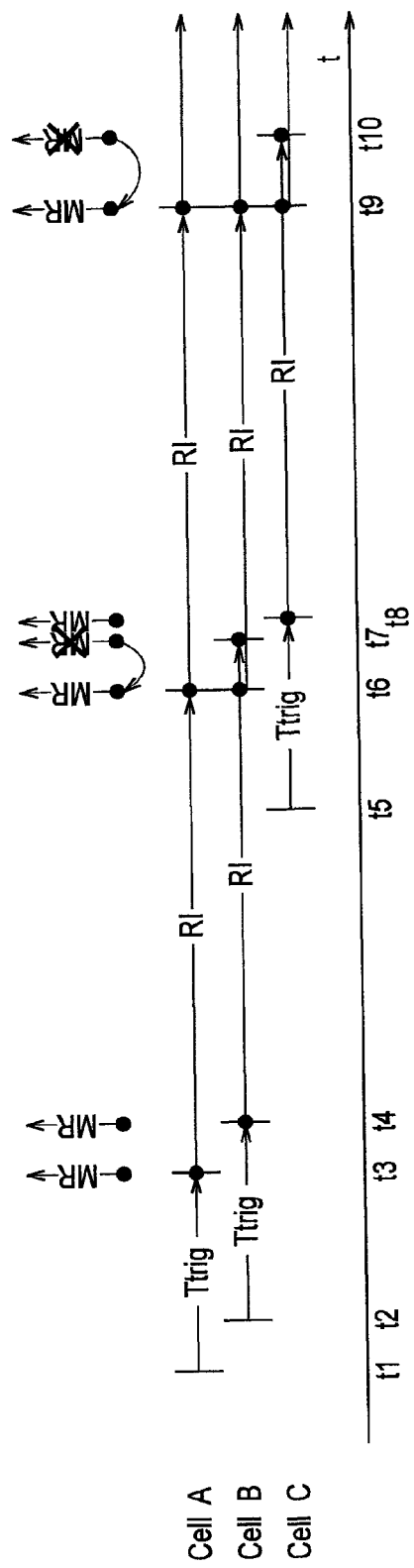
FIG. 5 is a chart showing an example of transmission timings of the Measurement Report of the mobile station according to the first embodiment of the present invention.

For example, referring to FIG. 5, consider a case where the Measurement Report transmitter unit 13 does not detect, at t6, that "Time to Trigger (monitor period)" has passed in a state where a radio quality of a cell C (second cell) still satisfies an "Event (entering conditions)". In this case, the Measurement Report transmitter unit 13 is configured not to start transmitting a "Measurement Report (second measurement report)" including the radio quality of the cell C (second cell), even when one of timings to repeatedly transmit a "Measurement Report (first measurement report)" including a radio quality of a cell A (first cell) has come.

In addition, the Measurement Report transmitter unit 13 may be configured to adjust to concur a starting point of the "Reporting Interval (reporting interval)" used to determine the timings to repeatedly transmit the "Measurement Report (first measurement report)" with a timing to start transmitting the "Measurement Report (second measurement report)".

Figure 6:
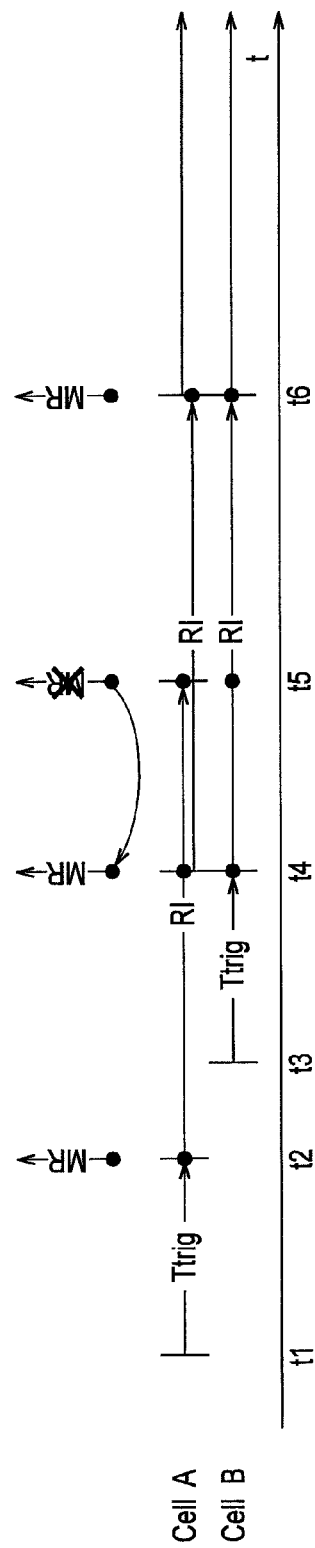
FIG. 6 is a chart showing an example of transmission timings of the Measurement Report of the mobile station according to the first embodiment of the present invention.

For example, as shown in FIG. 6, the Measurement Report transmitter unit 13 may be configured to change the starting point of the "Reporting Interval (reporting interval)" used to determine the timings to repeatedly transmit the "Measurement Report (first measurement report)" including the radio quality of the cell A (first cell), from t5, to a timing to start transmitting the "Measurement Report (second measurement report)" including the radio quality of the cell B (second cell), i.e., to t4.

Furthermore, the Measurement Report transmitter unit 13 may be configured to manage a "Max RI (Maximum Reporting Interval)" and a "Min RI (Minimum Reporting Interval)" as the "Reporting Intervals (reporting interval)".

Here, the Measurement Report transmitter unit 13 may be configured to repeatedly transmit the "Measurement Report (first measurement report)" and to repeatedly transmit the "Measurement Report (second measurement report)" at the same timings in the following case. Specifically, the case is where a period between one of the timings to repeatedly transmit the "Measurement Report (first measurement report)" determined by the "Max RI (Maximum Reporting Interval)" and one of the timings to repeatedly transmit the "Measurement Report (first measurement report)" determined by the "Min RI (Minimum Reporting Interval)" overlaps at least partially with a period between one of the timings to repeatedly transmit the "Measurement Report (second measurement report)" determined by the "Max RI (Maximum Reporting Interval)" and one of the timings to repeatedly transmit the "Measurement Report (second measurement report)" determined by the "Min RI (Minimum Reporting Interval)".

Figure 7:
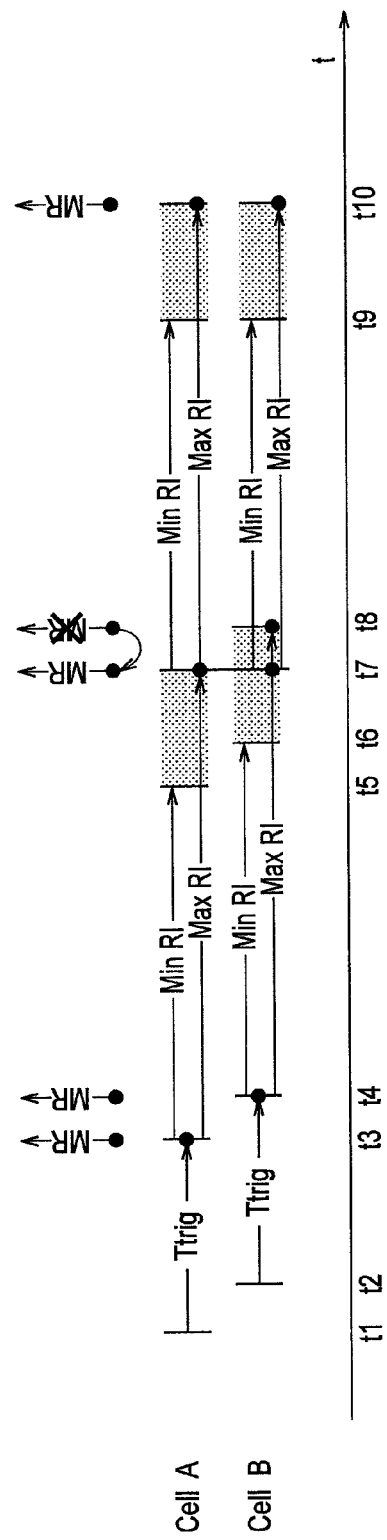
FIG. 7 is a chart showing an example of transmission timings of the Measurement Report of the mobile station according to the first embodiment of the present invention.

In an example in FIG. 7, one of the timings to repeatedly transmit the "Measurement Report (first measurement report)" including the radio quality of the cell A determined by the "Max RI (Maximum Reporting Interval)" is "t7", while one of the timings to repeatedly transmit the "Measurement Report (first measurement report)" including the radio quality of the cell A determined by the "Min RI (Minimum Reporting Interval)" is "t5".

Meanwhile, one of the timings to repeatedly transmit the "Measurement Report (second measurement report)" including the radio quality of the cell B determined by the "Max RI (Maximum Reporting Interval)" is "t8", while one of the timings to repeatedly transmit the "Measurement Report (second measurement report)" including the radio quality of the cell B determined by the "Min RI (Minimum Reporting Interval)" is "t6".

As shown in the example in FIG. 7, the period between "t5" and "t7" overlaps partially with the period between "t6" and "t8". Accordingly, the Measurement Report transmitter unit 13 is configured to repeatedly transmit the "Measurement Report (first measurement report)" including the radio quality of the cell A, and to repeatedly transmit the "Measurement Report (second measurement report)" including the radio quality of the cell B at the same timing, i.e., at t7.

Alternatively, the Measurement Report transmitter unit 13 may be configured to, not at the same timings, repeatedly transmit the "Measurement Report (first measurement report)" and to repeatedly transmit the "Measurement Report (second measurement report)" in the following case. Specifically, the case is where a period between one of the timings to repeatedly transmit the "Measurement Report (first measurement report)" determined by the "Max RI (Maximum Reporting Interval)" and one of the timings to repeatedly transmit the "Measurement Report (first measurement report)" determined by the "Min RI (Minimum Reporting Interval)" does not overlap even partially with a period between one of the timings to repeatedly transmit the "Measurement Report (second measurement report)" determined by the "Max RI (Maximum Reporting Interval)" and one of the timings to repeatedly transmit the "Measurement Report (second measurement report)" determined by the "Min RI (Minimum Reporting Interval)".

Figure 8:
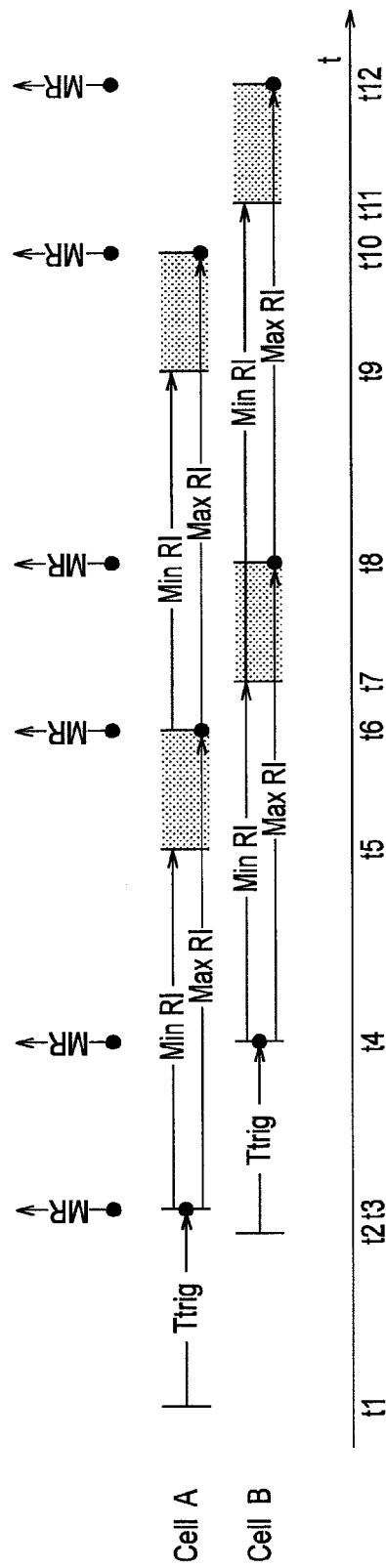
FIG. 8 is a chart showing an example of transmission timings of the Measurement Report of the mobile station according to the first embodiment of the present invention.

In the example in FIG. 8, one of the timings to repeatedly transmit the "Measurement Report (first measurement report)" including the radio quality of the cell A determined by "Max RI (Maximum Reporting Interval)" is "t6", while one of the timings to repeatedly transmit the "Measurement Report (first measurement report)" including the radio quality of the cell A determined by "Min RI (Minimum Reporting Interval)" is "t5".

Meanwhile, one of the timings to repeatedly transmit the "Measurement Report (second measurement report)" including the radio quality of the cell B determined by the "Max RI (Maximum Reporting Interval)" is "t8", while one of the timings to repeatedly transmit the "Measurement Report (second measurement report)" including the radio quality of the cell B determined by the "Min RI (Minimum Reporting Interval)" is "t7".

As shown in the example in FIG. 8, the period between "t5" and "t6" does not overlap with the period between "t7" and "t8". Accordingly, the Measurement Report transmitter unit 13 is configured to repeatedly transmit the "Measurement Report (first measurement report)" including the radio quality of the cell A at t6, and to repeatedly transmit the "Measurement Report (second measurement report)" including the radio quality of the cell B at t8.

Furthermore, the Measurement Report transmitter unit 13 may be configured to adjust to concur the starting point of "Reporting Interval (reporting interval)" used to determine the timings to repeatedly transmit the "Measurement Report (first measurement report)" with a timing to start transmitting the "Measurement Report (second measurement report)" in the following case. Specifically, the case is where the Measurement Report transmitter unit 13 starts transmitting the "Measurement Report (second measurement report)" during a period between one of the timings to repeatedly transmit the "Measurement Report (first measurement report)" determined by the "Max RI (Maximum Reporting Interval)" and one of the timings to repeatedly transmit the "Measurement Report (first measurement report)" determined by the "Min RI (Minimum Reporting Interval)".

Figure 9:
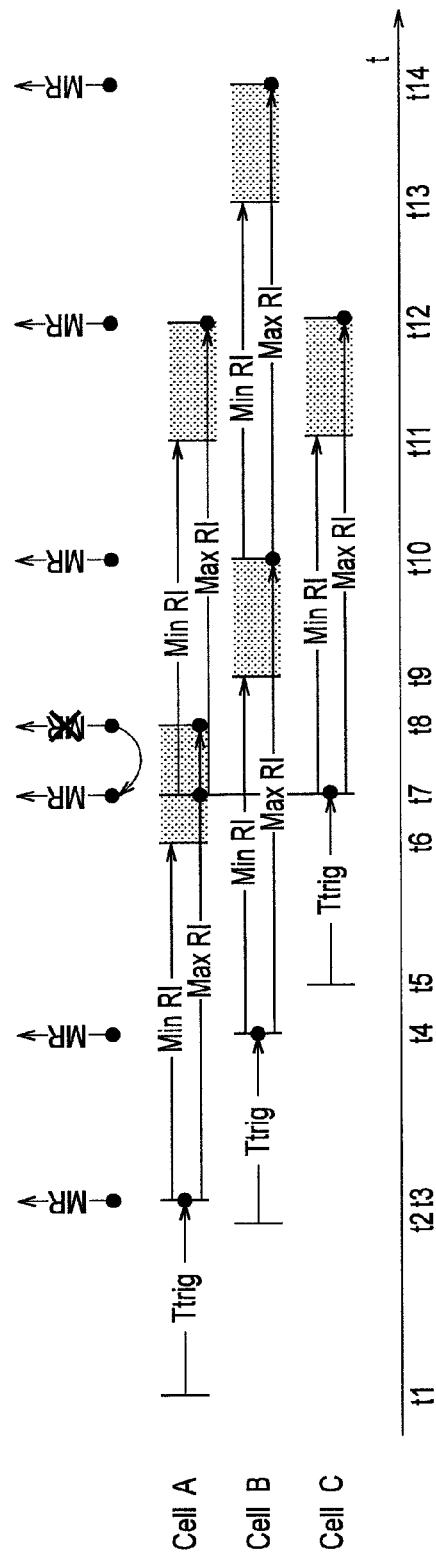
FIG. 9 is a chart showing an example of transmission timings of the Measurement Report of the mobile station according to the first embodiment of the present invention.
Figure 10:
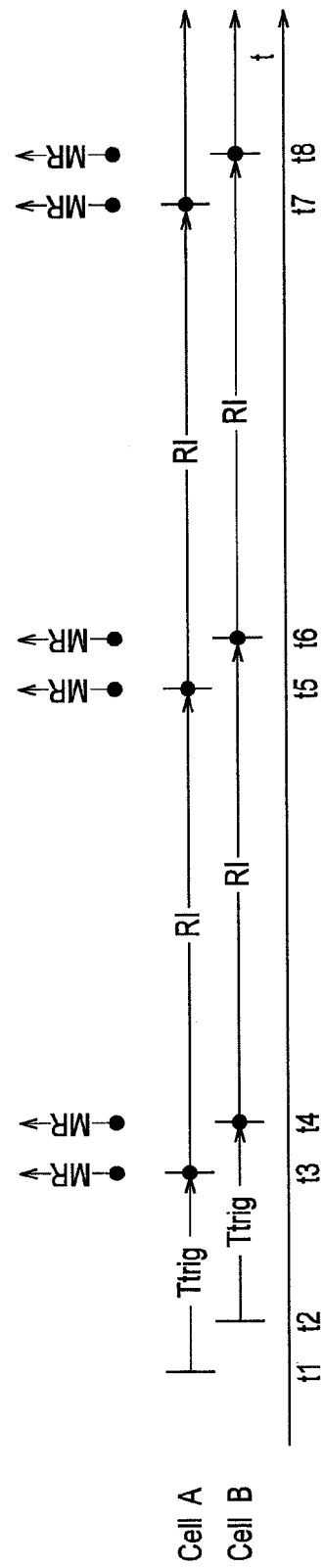
FIG. 10 is a chart showing an example of transmission timings of a Measurement Report of a mobile station according to a prior art.

In the example in FIG. 9, one of the timings to repeatedly transmit the "Measurement Report (first measurement report)" including the radio quality of the cell A determined by "Max RI (Maximum Reporting Interval)" is "t8", while one of the timings to repeatedly transmit the "Measurement Report (first measurement report)" including the radio quality of the cell A determined by "Min RI (Minimum Reporting Interval)" is "t6".

Meanwhile, the timing when the Measurement Report transmitter unit 13 starts transmitting the "Measurement Report (second measurement report)" including the radio quality of the cell C is "t7".

As shown in the example in FIG. 9, "t7" is within the period between "t6" and "t8". Accordingly, the Measurement Report transmitter unit 13 may be configured to change the starting point of the "Reporting Interval (reporting interval)" used to determine the timings to repeatedly transmit the "Measurement Report (first measurement report)" including the radio quality of the cell A, from t8, to a timing to start transmitting the "Measurement Report (second measurement report)" including the radio quality of the cell C, i.e., to t7.

Note that the Measurement Report transmitter unit 13 may be configured not to transmit, at the same timings, "Measurement Reports" including radio qualities of multiple cells to which different "Measurement Ids" are applied respectively, even when the above conditions are satisfied.

Also note that the Measurement Report transmitter unit 13 may be configured not to transmit, at the same timings, "Measurement Reports" including radio qualities of multiple cells to which different "Reporting Configurations" are applied respectively, even when the above conditions are satisfied.

This is because the different "Reporting Configurations" may include different "Reporting Intervals (reporting interval)" or different "Time to Trigger (monitor period)".

(Advantageous Effects of Mobile Communication System According to First Embodiment of the Present Invention)

In the mobile communication system according to the first embodiment of the present invention, the Measurement Report transmitter unit 13 is configured to repeatedly transmit the "Measurement Report (first measurement report)" and to repeatedly transmit the "Measurement Report (second measurement report)" at the same timings. Therefore, it is possible to prevent wasteful use of radio resources even when the number of cells to be measured is increased.

In addition, by use of the mobile communication system according to the first embodiment of the present invention, it is possible to reduce overhead of the "Scheduling Request (allocation request)" or "PDCCH", as the repeated transmission of the "Measurement Report (measurement report)" is made less frequently.

Note that the operation of the radio base station eNB or of the mobile station UE may be implemented by hardware, may be implemented by a software module that is executed by a processor, or may be implemented by combination of both.

The software module may be provided in any form of storage media including a RAM (Random Access Memory), a flash memory, a ROM (Read Only Memory), an EPROM (Erasable Programmable ROM), an EEPROM (Electronically Erasable and Programmable ROM), a register, a hard disc, a removable disc, and a CD-ROM.

Such storage media are connected to the processor so as to allow the processor to read or write information from or to the storage media. Alternatively, such the storage media may be integrated into a processor. Furthermore, the storage media or the processor may be provided in ASIC. The ASIC may be provided in the radio base station eNB or the mobile station UE. Instead, the storage media or the processor may be provided in the radio base station eNB or the mobile station UE as discrete components.

Hereinabove, the present invention has been described in detail using the above embodiment. However, it is apparent for those skilled in the art that the present invention is not limited to the embodiment described herein. The present invention can be implemented as modifications and alternative embodiments without departing from the gist and scope of the invention defined by the description of the scope of claims. Accordingly, the description herein is intended only for an exemplary purpose and has no intention to limit the present invention.

The invention claimed is:

1. A mobile station configured to start transmitting a measurement report including a radio quality of multiple cells upon detecting that a monitor period has passed in a state where the radio quality of the multiple cells still satisfies an entering condition, and to repeatedly transmit the measurement report at reporting intervals until a leaving condition is satisfied, wherein when, during communication, the mobile station starts transmitting a first measurement report including a radio quality of a first cell among multiple cells and thereafter starts transmitting a second measurement report including a radio quality of a second cell among multiple cells, the mobile station is configured to repeatedly transmit the first measurement report and to repeatedly transmit the second measurement report, at the same timings, wherein the mobile station is in connected mode, and wherein the mobile station is configured not to start transmitting the second measurement report even if the mobile station does not detect that the monitor period has passed in a state where the radio quality of the second cell among multiple cells satisfies the entering condition and when one of the timings to repeatedly transmit the first measurement report comes.

* * * * *